Jan. 6, 1925.

F. H. GRAMS 1,522,440

SEED COVERING ATTACHMENT FOR AGRICULTURAL IMPLEMENTS

Filed June 17, 1922

Inventor
Fred H. Grams,
By
Attorney

Patented Jan. 6, 1925.

1,522,440

UNITED STATES PATENT OFFICE.

FRED H. GRAMS, OF STEWART, MINNESOTA.

SEED-COVERING ATTACHMENT FOR AGRICULTURAL IMPLEMENTS.

Application filed June 17, 1922. Serial No. 569,035.

*To all whom it may concern:*

Be it known that FRED H. GRAMS, a citizen of the United States of America, residing at Stewart, in the county of McLeod and State of Minnesota, has invented new and useful Improvements in Seed-Covering Attachments for Agricultural Implements, of which the following is a specification.

The object of the invention is to provide a simple, inexpensive and efficient seed covering attachment for planters and similar agricultural implements as a means of drawing the soil into covering and hilling relation with seed progressively planted in drills or hills; and with this object in view the invention consists in a construction and combination of parts of which a preferred embodiment is shown in the accompanying drawings, wherein:—

Figure 1:
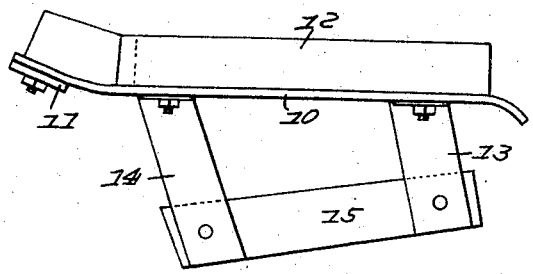
Figure 1 is a side view.
Figure 2:
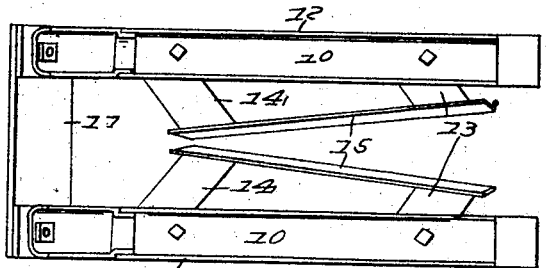
Figure 2 is a top plan view of a covering attachment embodying the invention.
Figure 3:
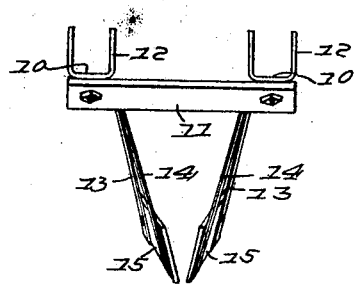
Figure 3 is a rear view of the same.

The device consists essentially of a frame having parallel side bars 10 connected at their rear ends by a cross bar 11 and supporting cross sectionally U-shaped stiffening bars 12, while depending from the frame and supported by front and rear hangers 13 and 14 are the rearwardly convergent blades 15 arranged at an upward inclination toward their front ends and preferably transversely inclined or arranged in upwardly versely inclined or arranged in upwardly divergent relation cross-sectionally as indicated in Figure 3 to produce the effect in operation of gathering the soil and shifting or transferring it laterally in both directions toward an intermediate line represented in practice by the line of drill or hills in which the planting is effected to satisfactorily cover the seed without imposing an objectionable resistance to the forward progress of the machine in connection with which it may be employed.

Having described the invention, what is claimed as new and useful is:—

A hilling or seed covering attachment for agricultural implements consisting of parallel side bars, a cross bar connecting said side bars at their rear ends, cross sectionally U-shaped stiffening bars mounted on top of said side bars, a pair of covering blades, and front and rear hangers depending from said side bars and supporting said covering blades to dispose the latter at a downward inclination rearwardly and in rearward convergent relation.

In testimony whereof he affixes his signature.

FRED H. GRAMS.